United States Patent [19]

Sugalski

[11] 4,105,832

[45] Aug. 8, 1978

[54] AN ELECTRO-CHEMICAL BATTERY COMPRISING A PLATE HAVING STIPPLED SUBSTRATE

[75] Inventor: Raymond Kazimir Sugalski, Gainesville, Fla.

[73] Assignee: General Electric Company, Gainesville, Fla.

[21] Appl. No.: 825,046

[22] Filed: Aug. 16, 1977

Related U.S. Application Data

[63] Continuation of Ser. No. 577,419, May 14, 1979, abandoned, which is a continuation of Ser. No. 413,589, Nov. 7, 1973, abandoned.

[51] Int. Cl.² .......................................... H01M 10/30
[52] U.S. Cl. ..................................... 429/94; 429/222; 429/223; 429/241
[58] Field of Search ................. 429/94, 217, 223, 222, 429/233, 241, 245; 428/131, 132, 174; 29/193.5, 193, 183

[56] References Cited

U.S. PATENT DOCUMENTS

| 397,796 | 2/1889 | Gibson | 429/239 |
| 556,769 | 3/1896 | Pirsch | 429/245 X |
| 3,023,260 | 2/1962 | Coler et al. | 429/94 |
| 3,503,806 | 3/1970 | Sugalski | 429/55 |

FOREIGN PATENT DOCUMENTS

| 170,043 | 10/1921 | United Kingdom | 429/209 |
| 682,430 | 11/1952 | United Kingdom | 429/94 |

Primary Examiner—Anthony Skapars

[57] ABSTRACT

A pasted or pressed plate for an electrolytic cell or battery having an electrically conductive, perforated substrate with embossed major surfaces.

5 Claims, 4 Drawing Figures

U.S. Patent     Aug. 8, 1978     4,105,832
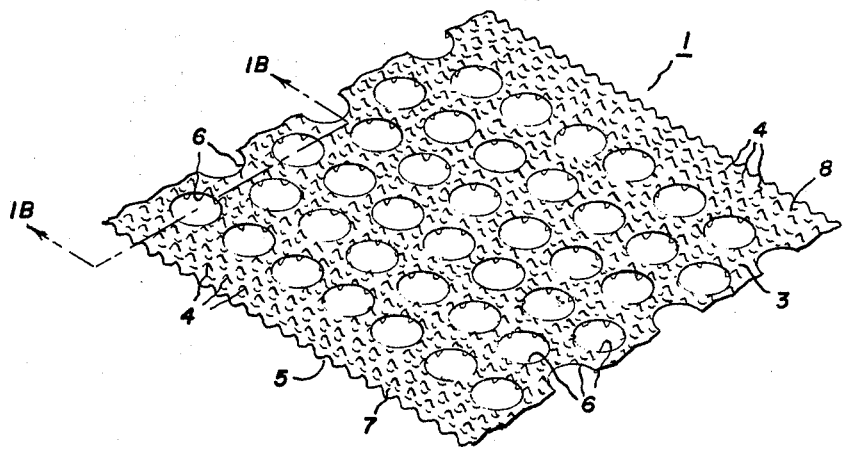
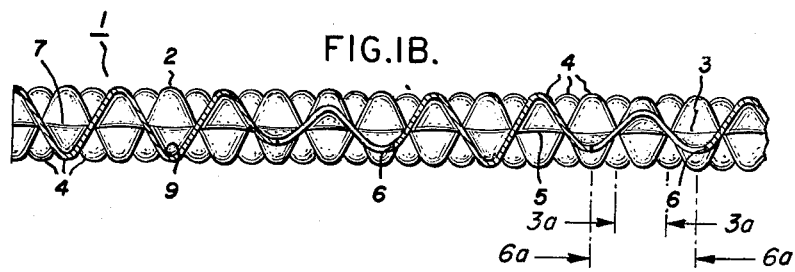
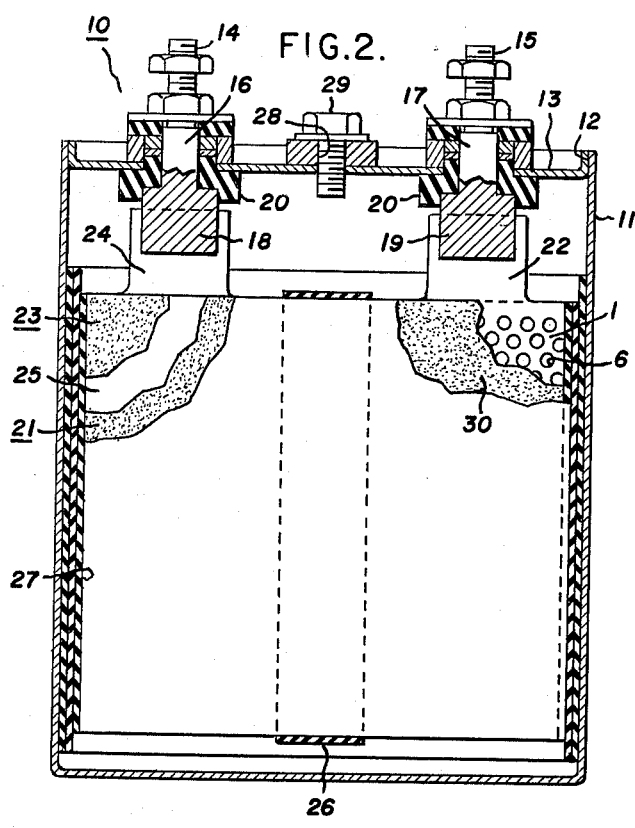
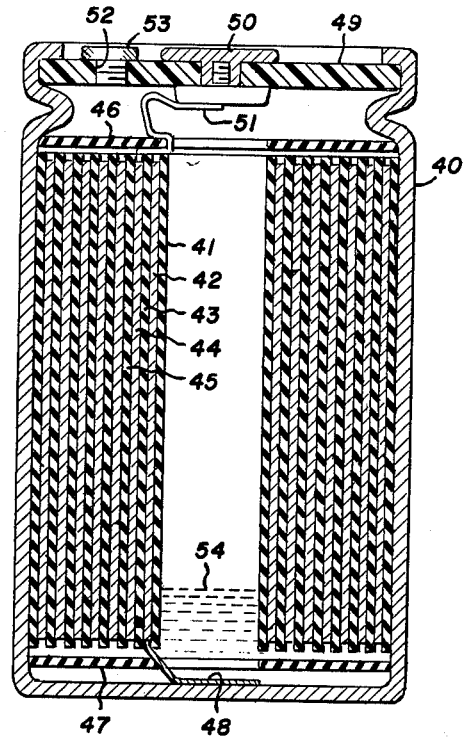

AN ELECTRO-CHEMICAL BATTERY COMPRISING A PLATE HAVING STIPPLED SUBSTRATE

This is a continuation of application Ser. No. 577,419 filed May 14, 1979 in turn a continuation of application Ser. No. 413,589 filed Nov. 7, 1973, both now abandoned.

BACKGROUND OF THE INVENTION

This invention relates to improved electrochemical cells or batteries and more particularly to an electrochemical cell having a novel type of material for use as a current collecting substrate for supporting the active material in a pasted or pressed plate construction.

A cell plate or electrode in an electrochemical cell is comprised of a substrate of thin sheet-like material with a layer of active material on each side. In a so-called "pasted" plate construction, the active material may be spread onto the substrate or applied by other well-known techniques. Usually the active material in paste form is spread with a doctor blade or by calendering so that the paste is uniformly distributed over area of the substrate which is to be electrochemically active in charge/discharge cycles of the cell.

Expanded metal and woven screen or mesh of electrically conductive material are examples of known substrate materials for pasted plates. The choice between the different substrate constructions has been guided by the fact that the active material composition has a tendency to dislodge from the substrate due to vibration occurring during processing or use. Also, after extended use, volumetric changes during charge/discharge cycles have a tendency to cause the composition to dislodge. For this reason screen wire mesh and expanded metal materials for substrate construction have been almost uniformly adopted in the industry for pressed plate construction.

One commercially available form of these materials is a wide sheet configuration. However, since most cell plates have at least one narrow dimension, the wide sheets must be cut into strips resulting in a raw edge portion defined by the sharp endsof the severed screen wires or expanded metal segments. These constructions have proved to be unsatisfactory because the raw edge complicates further processing of the cell, particularly by penetrating the separator and causing an electrical short between the cell plates.

To date, there is no known solution to the problems caused by the raw edge construction when using expanded metal materials.

With respect to the screen wire construction, these problems have been overcome by special manufacture of the screen in narrow strips with a selvaged edge, i.e., the wires running parallel to the narrow dimension are woven from one continuous strand such that the edge of the strip is defined by looped portions of the single strand. This construction adds greatly to the cost of the screen. Furthermore, the screen mesh, if small diameter wire is used, is easily broken which can cause shorting between the plates, an open circuit, or an increase in impedance. Also, the small diameter of the wires inherently yields a substrate of relatively high impedance.

SUMMARY OF THE INVENTION

It is, therefore, an object of this invention to provide a new and improved electrochemical cell.

Another object of this invention is to provide a new and improved substrate construction having a surface to which the active material will readily adhere.

Another object of this invention is to provide a reliable substrate construction which is stronger, more economical, and has lower electrical resistance.

In accordance with the invention, an electrochemical cell is provided comprising a plate constructed of an electrically conductive, perforated substrate having embossed surfaces with a layer of pasted active material adhering to each surface.

These and other objects of this invention will be better understood from the following description, taken in connection with the accompanying drawings.

BRIEF DESCRIPTION OF DRAWINGS

FIG. 1(A) is a fragmentary perspective view of a substrate, for a pasted electrode, constructed in accordance with this invention.

FIG. 1(B) is a cross-section of the substrate taken along Line I—I of FIG. 1(A).

FIG. 2 is an axial section, partially broken away, of a battery incorporating an electrode having a substrate as shown in FIG. 1.

FIG. 3 is an axial section of another embodiment of a battery in which a pasted electrode having a substrate in accordance with FIG. 1 may be incorporated.

DESCRIPTION OF THE INVENTION

Referring now to FIGS. 1(A) and 1(B), a substrate constructed in accordance with this invention is generally denoted by 1. The material used for this substrate is preferably perforated nickel or nickel-plated steel of approximately 2-4 mils in thickness. The major surfaces 3, 5 of the substrate, in their entirety, are embossed by any available conventional means (not shown) typically utilized for knurling or embossing bulk metallic materials to produce closely spaced bosses 4 approximately 40 mils apart. This can increase the effective thickness of the substrate up to 7-8 times the original thickness. A uniform pattern of bosses is impressed in the substrate 1 such that in one of the major surfaces the recess 9 of one boss is adjacent the projection 2 of another boss recessed from the opposite major surface. The projection 2 and recess 9 are offset from each other such that the material does not have a preferred "hand". That is to say, the arrangement of the bosses is made such that the major surfaces 3, 5 are interchangeable as to their operative aspects in accordance with invention herein.

In accordance with another feature of this invention, perforations 6 are provided in the major surfaces 3, 5 of the substrate. The major surfaces have edge portions 7, 8 which remain unperforated. Although not critical, the perforations may be approximately 5000 square mils in area and may be spaced approximately 110 mils apart. They may be made in the substrate by any conventional method and, as can best be seen in FIG. 1B, particularly from the projection 6a—6a of the diameter of the perforations and projection 3a—3a of the diameter of the bosses, the ratio of the cross sectional diameter of perforations 6 to bosses 3 is substantially greater than 1. As can be seen, since the respective spacings of the perforations 6 and the bosses 4 are different, the perforations 6 penetrate the bosses 4 at various portions thereof throughout the major surfaces.

The substrate 1 is used as a conductive support for the composition, containing the electrochemically active material, which, in combination with the substrate, form the plates of a cell or battery. Due to the nature of the composition or paste, it has heretofore been observed that the paste does not readily adhere to some substrates. In accordance with this invention, the substrate 1 is provided with perforations 6 and closely spaced bosses 4 in the major surfaces 3, 5, which results in greatly improving the adherence of the paste to the substrate. Furthermore, in accordance with this invention, since the substrate does not have a preferred hand, the paste adheres equally well to both major surfaces 3, 5 of the substrate 1. This enables the manufacture of cells having a more uniform quality and, more particularly, a longer life.

It will be understood that, while the disclosed dimensions for the substrate, and the perforations and bosses therein, are preferred and have been found to enhance the adherence of a sufficiently large quantity of paste, they may be varied within the scope of this invention.

The paste is composed of an active material and binders therefor as is well known in the art. A suitable binder is, for example, Teflon. After formation, the paste may be spread onto the substrate 1 with a doctor blade or by calendering so that the paste is uniformly distributed over the major surface areas of the substrate which is to be electrochemically active in charge/discharge cycles of the cell or by any other well known technique in the art.

A plate incorporating a substrate constructed in accordance with this invention will avoid many problems associated with the prior art construction, particularly the screen wire mesh substrate. In particular, these plates will be stronger and of lower resistance than those constructed in accordance with the prior art teaching. One of the most distinct advantages of a plate utilizing the substrate of the present invention is that it is much more economical than a substrate made from screen wire mesh as in the prior art.

In the application of this invention to specific cell or battery constructions, any number of well known, conventional configurations may be employed. For example, the flat plate construction and the spiral plate construction shown in FIGS. 2 and 3, respectively, may be employed in accordance with the invention herein.

In FIG. 2, a rechargeable, sealed secondary battery 10 is shown to illustrate the parallel plate construction. The cell 10 has a casing 11 comprising an open top casing portion 12 of generally rectangular configuration which may be made of electrically insulating material or metal as shown. The open top of the housing portion 12 is sealed by a top wall 13 which may be made of electrically insulating material or metal. Top wall 13 carries a positive terminal 14 and a negative terminal 15. The terminals 14 and 15 have conductive portions 16 and 17, respectively, which extend through and below the top wall 13 and carry respectively connecting tab portions 18 and 19. Since top wall 13 is shown as metal, the terminal structure includes an electrically insulating gasket 20 between wall 13 and each terminal 14 and 15.

A negative plate 21 comprises the substrate 2 with a connecting tab 22 connected thereto in any suitable manner. A positive plate 23 comprises the substrate 2 with a connecting tab 24 connected thereto in any suitable manner. The substrates 2 of the negative and positive plates are coated with a paste composition 30 coated on each side thereof as described hereinabove. The connecting tabs 22 and 24 are connected to the tabs 18 and 19, respectively, by any conventional method. Separator 25 of suitably chemical inert material, such as unwoven nylon fabric, is positioned between adjacent plates. Separator 25 is preferably in the form of a tab and wound around the plate stack so as to position the separator material between the plates. A suitable electrolyte, such as potassium hydroxide, is impregnated into the separator, thereby making an electrolytic connection between the negative and positive plates 21 and 23. A binding strip 26 of electrically insulating material is preferably used to hold the plates and the separator within the minimum volume. A two-piece electrically insulated plastic cell liner 27 surrounds the plate, separator material, and binding strip whereby these components are held in a compact arrangement and are electrically insulated from metal casing 12. It will, of course, be appreciated that if the casing portion is made of an electrically insulating material, such plastic liner can be dispensed with. A vent cap 29 closes aperture 28 thereby providing a sealed or non-vented cell.

A spiral plate construction is illustrated in FIG. 3. The battery includes an electrically conductive casing 40 forming one terminal of the cell. Within the cell is mounted a winding spindle 41 formed of insulating material and having spirally wound thereon a four-layer assembly consisting of a first layer 42 which is the negative plate, a second layer 43 formed of a porous insulating separator, a third layer 44 which is a positive plate, and a fourth layer 45 which is a porous insulating separator. The positive and negative plates, as in the flat plate construction of FIG. 2, comprise a substrate 2 with an active material containing paste 55 coated on each side thereof. To prevent short-circuiting between the edges of the plates and the cell casing, annular insulating discs 46 and 47 are provided. The negative plate 42 is connected to the cell casing 40 through lead 48. To provide a negative cell terminal, an insulating element 49 is mounted to the upper end of the conductive casing by crimping. The element mounting positive terminal 50 is connected to the positive plate 44 by lead 31. A port 52 is provided in the insulating element for the admission of any conventional electrolyte to the cell. As shown, the port is provided with a plug 53. The electrolyte is drawn between the plates by capillary action of the porous insulating spacers. Excess electrolyte fills the bottom of the casing and may extend upwardly into the winding spindle to a level 54.

The batteries shown in FIGS. 2 and 3 preferably comprise rechargeable, secondary, nickel-cadmium cells. Such a cell in its discharged state has a negative plate comprising cadmium hydroxide, as the active material, mixed with the paste composition to be spread onto the substrate 1 and a positive plate comprising divalent nickel hydroxide as the active material mixed with the paste composition and attached to the substrate 1 in a similar manner. It will be understood that other active materials are readily useable with the invention as disclosed herein; and accordingly, the use of any particular type forms no part of this invention.

What I claim as new and desire to secure by Letters Patent of the United States is:

1. A nickel-cadmium electrolytic cell comprising:
   (a) a casing;
   (b) a coil disposed in said casing, said coil comprising:
      1. A positive plate and a negative plate, at least one of said plates comprising
         a. a thin conductive sheet with opposed major surfaces and having continuous uninterrupted edges, b. an array of spaced perforations extending through said sheet, intermediate said uninterrupted edges, c. an array of continuous, relatively smooth, closely spaced bosses in said sheet intermediate said edges and said perforations, each said boss comprised of a projection extending from one of said surfaces, said bosses in said array forming a pattern of alternating projections and recesses in each said surface intermediate said edges and intermediate said perforations, said bosses and said perforation being dimensioned at said surfaces such that the ratio of the cross-sectional dimensions of said perforations to said bosses is substantially greater than 1, d. a paste comprised of a binder and active material substantially covering said surfaces between said edges and extending through said perforations, and 2. a separator disposed between said positive and negative plates; and (c) an electrolyte in said casing.

2. The cell of claim 11 wherein each of said perforations has an area of approximately 5000 square mils.

3. The cell of claim 1 wherein said sheet is nickel-plated steel.

4. The cell of claim 1 wherein said sheet is made of nickel.

5. The cell of claim 1 wherein said sheet is between 2 and 4 mils thick.

* * * * *